United States Patent
Wu et al.

(10) Patent No.: US 10,906,465 B2
(45) Date of Patent: Feb. 2, 2021

(54) VEHICLE, DRIVING ASSISTANCE SYSTEM, AND DRIVING ASSISTANCE METHOD THEREOF

(71) Applicant: BOE TECHNOLOGY GROUP CO., LTD., Beijing (CN)

(72) Inventors: Naifu Wu, Beijing (CN); Xitong Ma, Beijing (CN); Lixin Kou, Beijing (CN); Sha Feng, Beijing (CN)

(73) Assignee: BOE TECHNOLOGY GROUP CO., LTD., Beijing (CN)

( * ) Notice: Subject to any disclaimer, the term of this patent is extended or adjusted under 35 U.S.C. 154(b) by 170 days.

(21) Appl. No.: 16/174,944

(22) Filed: Oct. 30, 2018

(65) Prior Publication Data

US 2019/0299854 A1 Oct. 3, 2019

(30) Foreign Application Priority Data

Mar. 27, 2018 (CN) .......................... 2018 1 0257743

(51) Int. Cl.
*B60Q 9/00* (2006.01)
*B60R 1/00* (2006.01)

(52) U.S. Cl.
CPC ................. *B60Q 9/00* (2013.01); *B60R 1/00* (2013.01); *B60R 2300/20* (2013.01); *B60R 2300/80* (2013.01)

(58) Field of Classification Search
None
See application file for complete search history.

(56) References Cited

U.S. PATENT DOCUMENTS

| 2006/0267747 A1* | 11/2006 | Kondo | B60Q 9/008 |
| | | | 340/435 |
| 2015/0203033 A1* | 7/2015 | Watanabe | B60R 1/00 |
| | | | 348/148 |
| 2017/0253181 A1* | 9/2017 | Choi | B60K 35/00 |

FOREIGN PATENT DOCUMENTS

| CN | 103358996 A | 10/2013 |
| CN | 103640524 A | 3/2014 |
| CN | 106143307 A | 11/2016 |
| CN | 107757479 A | 3/2018 |
| DE | 102013013857 A1 | 2/2014 |
| JP | 2005271813 A | 10/2005 |

OTHER PUBLICATIONS

First Office Action for Chinese Application No. 201810257743.5, dated Jul. 12, 2019, 7 Pages.

\* cited by examiner

*Primary Examiner* — Mulugeta Mengesha
*Assistant Examiner* — Charles N Hicks
(74) *Attorney, Agent, or Firm* — Brooks Kushman P.C.

(57) ABSTRACT

A vehicle, a driving assistance system and a driving assistance method thereof are provided. The driving assistance system includes: an alarm module arranged on a windshield wiper and configured to present prompt information; an acquisition module configured to acquire a first image including a target outside a vehicle viewed at a first position and a second image including the alarm module viewed at the first position, the first position being a position where eyes of a driver are located; and a control module configured to determine an overlapping region between a region of the second image occupied by the alarm module and a region of the first image occupied by the target, and control the alarm module to present the prompt information about the overlapping region.

20 Claims, 5 Drawing Sheets

VEHICLE, DRIVING ASSISTANCE SYSTEM, AND DRIVING ASSISTANCE METHOD THEREOF

CROSS-REFERENCE TO RELATED APPLICATION

This application claims priority to Chinese Patent Application No. 201810257743.5 filed on Mar. 27, 2018, which is incorporated herein by reference in its entirety.

TECHNICAL FIELD

The present disclosure relates to the field of intelligent driving technology, and in particular to a vehicle, a driving assistance system and a driving assistance method thereof.

BACKGROUND

Along with the development of living standards, vehicles have become necessities of life. When a driver drives a vehicle on a rainy day, the visibility is restricted. In addition, during operation of a windshield wiper, a sight line of the driver may be adversely affected to some extent. In this case, it is difficult for the driver to recognize a target (such as a lane marking, or, another vehicle or a person on the road) outside the vehicle. Hence, a traffic accident may easily occur, which is harmful to driving security.

SUMMARY

In one aspect, the present disclosure provides in some embodiments a driving assistance system for a vehicle, including: an alarm module, arranged on a windshield wiper of the vehicle and configured to present prompt information; an acquisition module configured to acquire a first image including a target outside the vehicle viewed at a first position and a second image including the alarm module viewed at the first position, the first position being a position where eyes of a driver are located; and a control module coupled to the acquisition module and the alarm module, and configured to determine an overlapping region between a second region of the second image and a first region of the first image, and control the alarm module to present the prompt information about the overlapping region, the second region being a region occupied by the alarm module and the first region being a region occupied by the target.

In a possible embodiment of the present disclosure, the acquisition module includes a first collection unit, a second collection unit, and a processing unit coupled to the first collection unit and the second collection unit. The first collection unit is configured to collect a third image including the target viewed at a second position, and the second position is a position where the first collection unit is located. The second collection unit is configured to acquire position information about the eyes of the driver. The processing unit is configured to acquire the first image in accordance with the third image and the position information about the eyes of the driver, and acquire the second image in accordance with the position information about the eyes of the driver and position information about the alarm module.

In a possible embodiment of the present disclosure, the first collection unit includes one or more collection assemblies arranged at at least one of a head or a tail of the vehicle, and the second collection unit is arranged inside the vehicle.

In a possible embodiment of the present disclosure, the acquisition module is configured to acquire 20 to 24 first images and 20 to 24 second images at uniform time intervals within one second.

In a possible embodiment of the present disclosure, the target includes at least one of: a lane marking, or, a person or another vehicle around a head of the vehicle.

In a possible embodiment of the present disclosure, the alarm module is a light-emitting diode (LED) light bar or a flexible display.

In a possible embodiment of the present disclosure, the alarm module is attached onto a side wall of the windshield wiper.

In a possible embodiment of the present disclosure, the alarm module is of a bar-like shape, an extension direction of the alarm module is the same as an extension direction of the windshield wiper, and a length of the alarm module is not greater than a length of the windshield wiper.

In a possible embodiment of the present disclosure, the length of the alarm module is equal to the length of the windshield wiper.

In a possible embodiment of the present disclosure, the prompt information includes an image of the target, or lightening of a third region, and the third region is a region on the alarm module corresponding to the overlapping region.

In another aspect, the present disclosure provides in some embodiments a driving assistance method, applied to the driving assistance system according to any of the above embodiments, including: acquiring the first image including the target outside the vehicle viewed at the first position and the second image including the alarm module viewed at the first position, the first position being a position where the eyes of the driver are located; determining the overlapping region between the second region of the second image and the first region of the first image, the second region being a region occupied by the alarm module and the first region being a region occupied by the target; and controlling the alarm module to present the prompt information about the overlapping region.

In a possible embodiment of the present disclosure, acquiring the first image including the target outside the vehicle viewed at the first position and the second image including the alarm module viewed at the first position includes: collecting the position information about the eyes of the driver and the third image including the target viewed at the second position; and acquiring the first image in accordance with the third image and the position information about the eyes of the driver, and acquiring the second image in accordance with the position information about the eyes of the driver and the position information about the alarm module.

In yet another aspect, the present disclosure provides in some embodiments a vehicle including the driving assistance system according to any of the above embodiments.

BRIEF DESCRIPTION OF THE DRAWINGS

In order to illustrate the technical solutions in embodiments of the present disclosure or in the related technologies in a clearer manner, the drawings used in the descriptions of the present disclosure or the related technologies will be described hereinafter briefly. Apparently, the drawings merely illustrate some embodiments of the present disclosure, and based on these drawings, a person skilled in the art may obtain other drawings without any creative effort.

DETAILED DESCRIPTION

The technical solutions in embodiments of the present disclosure will be described hereinafter in a clear and complete manner in conjunction with the drawings of the embodiments of the present disclosure. Apparently, the embodiments described herein are merely a part of, rather than all of, the embodiments of the present disclosure. All other embodiments obtained based on the embodiments of the present disclosure by those skilled in the art without any creative efforts fall within the protection scope of the present disclosure.

In the embodiments of the present disclosure, the expression "and/or" may merely be adopted to describe the relationship between objects, and it may include three relationships. For example, "A and/or B" may represent: there is only A, there are both A and B, or, there is only B.

In addition, words such as "first" and "second" may merely be adopted to differentiate different features rather than to implicitly or explicitly indicate any number or importance of the features. That is, when a feature is restricted by "first" or "second", it is implicitly or explicitly indicated that there may be one or more of the feature. Further, a phrase such as "a plurality of" may be adopted to indicate that the number of features is two or more than two, unless otherwise specified.

Unless otherwise specified or defined, expressions such as "arrange", "connect" and "in connection with" may have a general meaning, e.g., the word "connect" may refer to fixed connection, removable connection or integral connection; or, mechanical or electrical connection; or, direct connection, indirect connection via an intermediate component, or communication between two components; or, wired or wireless communication connection. The meanings of these words may be understood by a person skilled in the art in accordance with the specific situations.

In the related technologies, due to the restricted visibility on a rainy day, it is difficult to recognize a target, and thus a traffic accident may easily occur. In view of the above, the present disclosure is to provide a vehicle, a driving assistance system and a driving assistance method thereof.

The present disclosure provides in some embodiments a driving assistance system for a vehicle. The vehicle may be an automobile. A type of the automobile will not be particularly defined herein, e.g., it may be a car, a Sport Utility Vehicle or Suburban Utility Vehicle (SUV) or a truck. In addition, the use of the automobile will not be particularly defined herein either, e.g., it may be a family automobile, a bus or an intercity bus. The present disclosure will be described hereinafter in detail in conjunction with the drawings and the embodiments.

Figure 1:
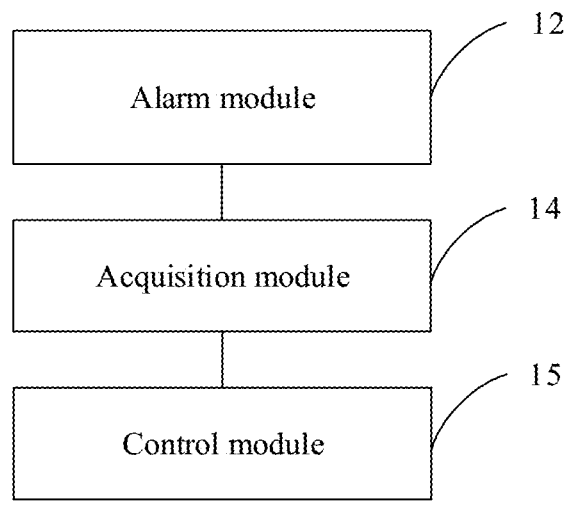
FIG. 1 is a schematic view showing a driving assistance system according to an embodiment of the present disclosure.
Figure 2:
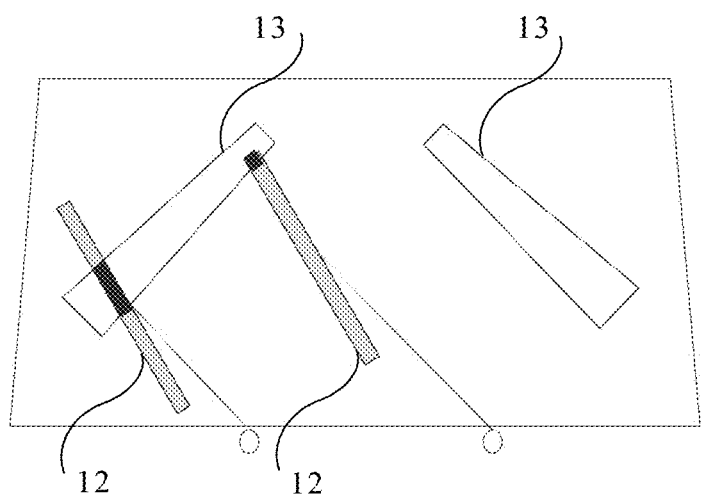
FIG. 2 is a schematic view showing presentation of lane markings by an alarm module according to an embodiment of the present disclosure.
Figure 3:
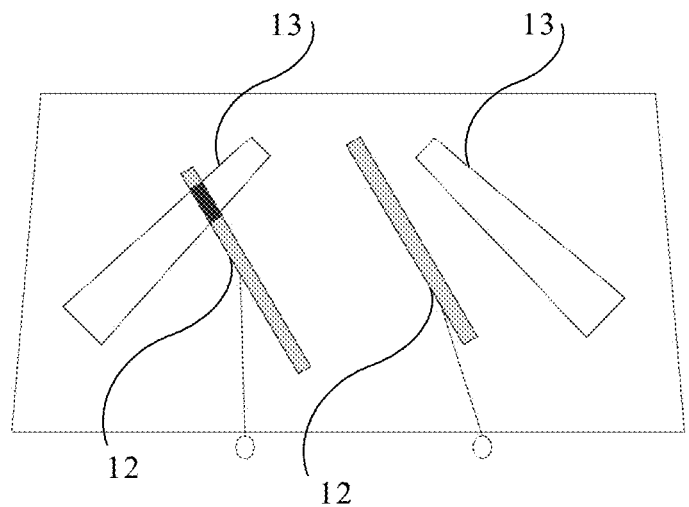
FIG. 3 is a schematic view showing presentation of lane markings by an alarm module according to an embodiment of the present disclosure.
Figure 4:
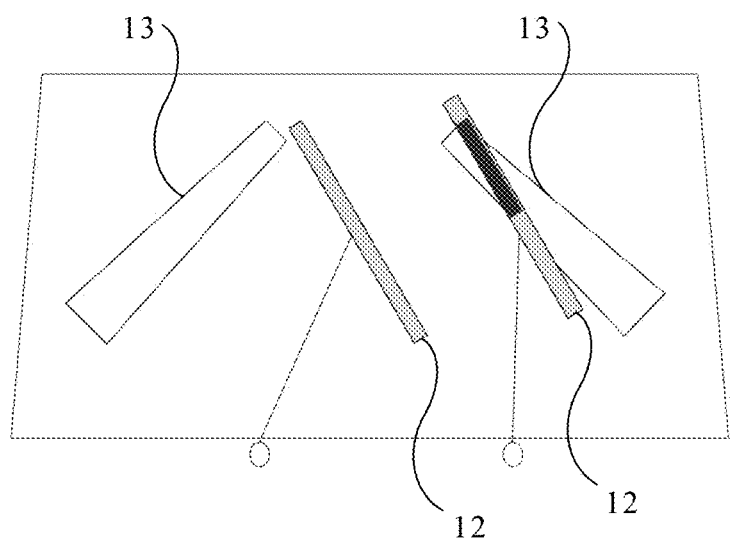
FIG. 4 is a schematic view showing presentation of lane markings by an alarm module according to an embodiment of the present disclosure.

As shown in FIG. 1, a driving assistance system according to an embodiment of the present disclosure includes an alarm module 12, an acquisition module 14 and a control module 15.

Reference is made to FIGS. 2 to 7. The alarm module 12 is arranged on a windshield wiper 11 of the vehicle. The alarm module 12 may be of a bar-like shape and extend in a same direction as the windshield wiper 11. The alarm module 12 is configured to generate prompt information visible to a driver. The alarm module 12 may be capable of presenting prompt information by utilizing various regions of the alarm module 12. The alarm module 12 may be configured to present the prompt information when the vehicle is in a driven state.

The acquisition module 14 is configured to acquire a first image including a target 13 outside the vehicle viewed at a first position and a second image including the alarm module viewed at the first position. The first position may be a position where eyes of a driver are located.

The control module 15 is coupled to the acquisition module 14 and the alarm module 12. The control module 15 is configured to determine an overlapping region between a second region of the second image and a first region of the first image, and control the alarm module 12 to present the prompt information about the overlapping region. The second region is a region occupied by the alarm module 12 and the first region is a region occupied by the target 13.

The acquisition module 14 is configured to acquire the first image including the target viewed at the position where the eyes of the driver are located, which may be implemented in various ways. For example, a vehicle-mounted camera having a shooting angle consistent with a viewing angle of the driver may be arranged in front of the vehicle, to acquire the first image including the target 13. For another example, a vehicle-mounted camera having a shooting angle inconsistent with the viewing angle of the driver may be arranged at a head or a tail of the vehicle, to acquire a third image including the target 13 and convert the third image including the target 13 into the first image including the target 13 viewed at the position where the eyes of the driver are located. The way to acquiring the first image will not be limited herein.

The acquisition module 14 is further configured to acquire the second image including the alarm module 12 viewed at the position where the eyes of the driver are located, which may be implemented in various ways. For example, the driver may wear a pair of spectacles equipped with a camera, to directly acquire the second image via the camera. For another example, a vehicle-mounted camera maybe arranged inside the vehicle to determine position information about the eyes of the driver, and then acquire the second image including the alarm module 12 viewed at the position where the eyes of the driver are located in accordance with the position information about the eyes of the driver, position information about the alarm module 12 and movement information about the alarm module 12. The way to acquiring the second image will not be limited herein.

Upon acquisition of the first image including the target 13 and the second image including the alarm module 12 viewed at the position where the eyes of the driver are located via the acquisition module 14, the control module 15 may match the first image with the second image, to acquire the overlapping region between a region of the second image where the alarm module 12 is located and a region of the first image where the target 13 is located. This overlapping region is a region where the target 13 is blocked by the alarm module 12 as viewed by the driver. The control module 15 may control the alarm module 12 to present the prompt information about the overlapping region, so as to prompt the driver of a position of the target 13. The target 13 in the first image may be, but not limited to, one or more of: a lane marking, or, a person or another vehicle around the head of the vehicle, which will not be limited herein. The presentation of the prompt information may be understood not only as displaying specific content of the target 13 (e.g., displaying an image of the target 13) by the alarm module 12, but also as a lightening operation performed by the alarm module 12, so as to prompt the driver of the position of the target 13. For example, the alarm module 12 may display the image of the target 13 at the third region, or lighten the third region. The third region is a region of the alarm module, where the region is corresponding to the overlapping region.

In some possible embodiments of the present disclosure, the control module 15 may be an element having a processing function, such as, a central processing unit (CPU) or a Field Programmable Gate Array (FPGA).

According to the driving assistance system in the embodiments of the present disclosure, the first image including the target and the second image including the alarm module viewed at the position where the eyes of the driver are located are acquired, the overlapping region between the region of the first image occupied by the target and the region of the second image occupied by the alarm module is determined, and then the prompt information about the overlapping region is presented by the alarm module. In this way, the position of the target is obtained by the driver through the presentation of the alarm module. As a result, the occurrence of a traffic accident, which is caused due to a difficulty in recognizing a target created by restricted visibility and blocked driver's sight line by the windshield wiper on a rainy day, is prevented, thereby improving driving security.

In a possible embodiment of the present disclosure, the acquisition module 14 includes a first collection unit, a second collection unit, and a processing unit coupled to the first collection unit and the second collection unit. The first collection unit is configured to collect the third image including the target 13 viewed at a second position. The second position is a position where the first collection unit is located. The second collection unit is configured to acquire position information about the eyes of the driver. The processing unit is configured to acquire the first image including the target, in accordance with the third image including the target 13 viewed at the second position and the position information about the eyes of the driver, and acquire the second image including the alarm module, in accordance with the position information about the eyes of the driver and position information about the alarm module 12.

The first collection unit may collect the third image including the target 13 viewed at the second position. The first collection unit may include one or more collection assemblies. The collection assembly may be a vehicle-mounted camera. In a case that the target 13 is a person or another vehicle around the head of the vehicle, the collection assembly may be arranged at the head of the vehicle, to collect the third image including the person or the another vehicle around the head of the vehicle, so as to prompt the driver to pay attention to the person or the another vehicle. When the target 13 is a lane marking, the collection assembly may be arranged at the head of the vehicle, to collect the third image including the lane marking, so as to prompt the driver of a position of the lane marking when the driver is driving normally. In addition, the collection assemblies may also be arranged at both the head and the tail of the vehicle. At this time, the first image including the lane marking viewed at the position where the eyes of the driver are located may be acquired in a more accurate and complete manner in accordance with the third image including the lane marking collected by the collection assembly at the head of the vehicle and the third image including the lane marking collected by the collection assembly at the tail of the vehicle, so as to prompt the driver of the position of the lane marking in a better manner.

The second collection unit may collect the position information about the eyes of the driver. The second collection unit may be a vehicle-mounted camera. In order to facilitate collection, the second collection unit may be arranged on a sunvisor inside the vehicle.

Usually, the processing unit is an element having a processing function, such as, a CPU or FPGA. It should be appreciated that, the processing unit may be integrated into the acquisition module 14 or the control module 15, which will not be limited herein.

Upon collection of the third image including the target 13 via the first collection unit and collection of the position information about the eyes of the driver via the second collection unit, the processing unit may calculate information about the first image including the target viewed at the position where the eyes of the driver are located in accordance with information such as the third image including the target 13, a position and a collection angle of the first collection unit, and the position information about the eyes of the driver, and then acquire the first image including the target. In addition, the processing unit may acquire the second image including the alarm module viewed at the position where the eyes of the driver are located in accordance with the position information about the eyes of the driver, the position information about the alarm module 12 and the movement information about the alarm module 12.

It should be appreciated that, the first collection unit and the second collection unit each may be an image collection component specifically arranged on the vehicle, or an image collection component in an advanced driver assistance system (ADAS), which will not be limited herein.

Figure 5:
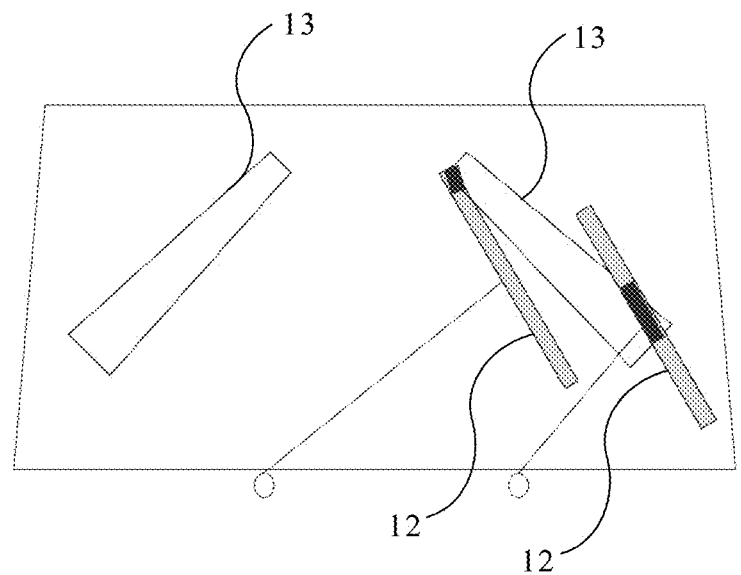
FIG. 5 is a schematic view showing presentation of lane markings by an alarm module according to an embodiment of the present disclosure.
Figure 6:
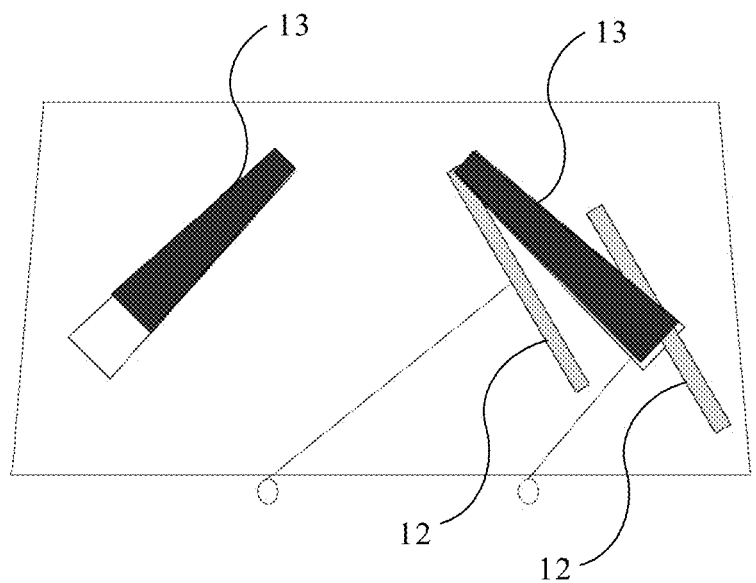
FIG. 6 is a schematic view showing presentation of lane markings by an alarm module according to an embodiment of the present disclosure.

In actual application, in order to prompt the driver of the position of the target 13 (e.g., the lane marking, or, the person or another vehicle outside the vehicle), the alarm module 12 needs to present the position of the target 13 in real time. That is, the first image including the target 13 viewed at the position where the eyes of the driver are located, and the second images of the same moment which includes the alarm module 12 viewed at the position where the eyes of the driver are located, need to be obtained continuously, the first image and the second image are processed in real time to determine the overlapping region, and then the overlapping region is presented in real time. FIGS. 2 to 5 show the presentation of the lane marking at the overlapping region (indicated by a black region) by the alarm module 12 at different time points. FIG. 5 shows an overlay effect of the overlapping regions within a certain time period, and this time period may be a duration within which the windshield wiper 11 moves from left to right or from right to left. Taking visual persistence into consideration, in actual application, the acquisition module 14 may acquire 20 to 24 first images including the target 13 viewed at the position where the eyes of the driver are located, and 20 to 24 second images including the alarm module 12 viewed at the position where the eyes of the driver are located, at uniform time intervals within one second.

Figure 7:
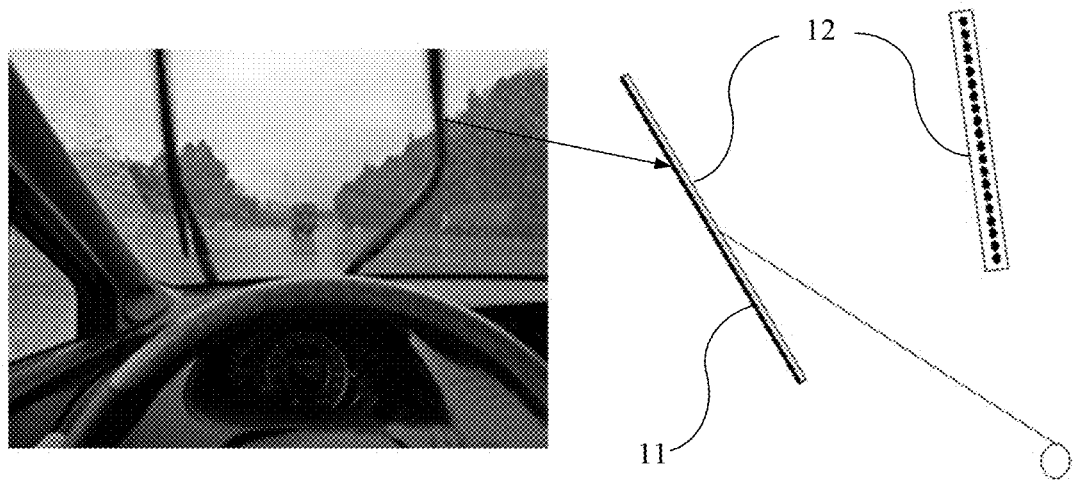
FIG. 7 is a schematic view showing a windshield wiper and an alarm module according to an embodiment of the present disclosure.
Figure 8:
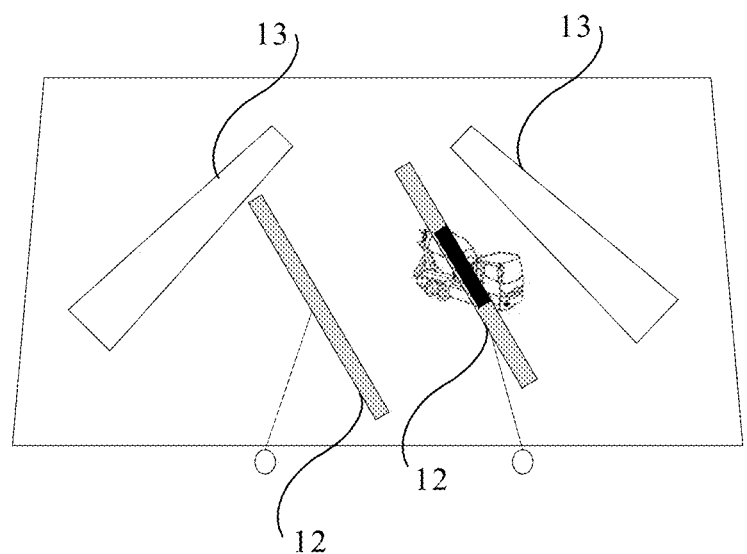
FIG. 8 is a schematic view showing presentation of a vehicle by an alarm module according to an embodiment of the present disclosure.

As shown in FIG. 7, the alarm module 12 may be arranged on, and move along with, the windshield wiper 11. The windshield wiper 11 may be activated on a rainy day automatically, or manually by the driver, which will not be limited herein. The driving assistance system according to the embodiments of the present disclosure may be enabled after the activation of the windshield wiper automatically, or manually by the driver, which will not be limited herein.

In a possible embodiment of the present disclosure, the alarm module 12 may be closely attached to a side wall of the windshield wiper 11, so as to reduce a blocking effect of the windshield wiper 11 on the sight line of the driver. In a possible embodiment of the present disclosure, a length of the alarm module 12 may be not greater than a length of the windshield wiper 11. In a possible embodiment of the present disclosure, the length of the alarm module 12 may be equal to the length of the windshield wiper 11. In this way, the blocking effect of the windshield wiper 11 on the sight line of the driver is reduced in a better manner, and display of the target 13 by the alarm module 12 is facilitated.

The alarm module 12 may be of various structures. For example, the alarm module 12 may be an LED light bar or a flexible display, which will not be limited herein. In a case that the alarm module 12 is an LED light bar, the control module 15 may control the alarm module 12 to present the prompt information about the overlapping region, i.e., the control module 15 may lighten the LED light bar at the third region, where the third region is a region of the alarm module 12 corresponding to the overlapping region. It should be appreciated that, since the alarm module 12 is arranged outside the vehicle and usually operates on a rainy day, the alarm module 12 may be water-proof.

The present disclosure further provides in some embodiments a vehicle, including the driving assistance system according to any of the above embodiments, to prompt the driver of the target.

Figure 9:
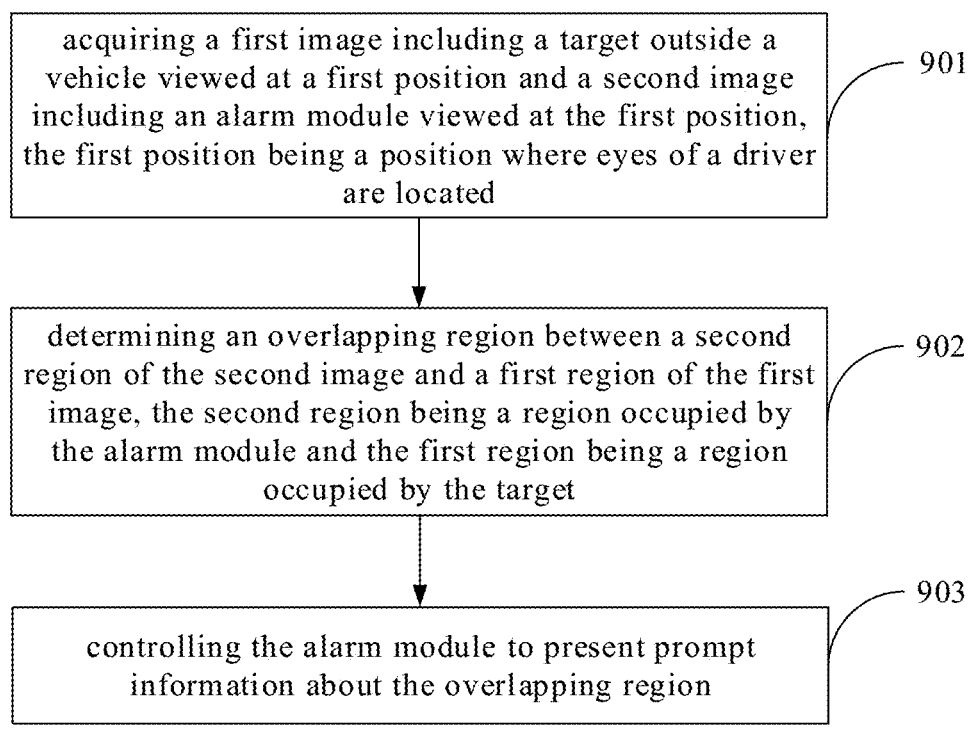
FIG. 9 is a flow chart of a driving assistance method for a vehicle according to an embodiment of the present disclosure.

The present disclosure further provides in some embodiments a driving assistance method, applied to the driving assistance system according to any of the above embodiment. As shown in FIG. 9, the driving assistance method may include steps 901 to 903.

In step 901, a first image including a target outside the vehicle viewed at a first position, and a second image including an alarm module viewed at the first position, are obtained, the first position being a position where eyes of a driver are located.

In step 902, an overlapping region, between a second region of the second image and a first region of the first image, is determined, the second region being a region occupied by the alarm module and the first region being a region occupied by the target.

In step 903, the alarm module is controlled to present prompt information about the overlapping region.

In a possible embodiment of the present disclosure, acquiring the first image including the target outside the vehicle viewed at the first position and the second image including the alarm module viewed at the first position may include: collecting position information about the eyes of the driver, and a third image including the target viewed at the second position; and acquiring the first image including the target viewed at the position where eyes of the driver are located, in accordance with the third image including the target viewed at the second position and the position information about the eyes of the driver, and acquiring the second image including the alarm module viewed at the position where eyes of the driver are located, in accordance with the position information about the eyes of the driver and position information about the alarm module.

In a possible embodiment of the present disclosure, acquiring the first image including the target outside the vehicle viewed at the first position and the second image including the alarm module viewed at the first position may include: acquiring 20 to 24 first images and 20 to 24 second images at uniform time intervals within one second.

In a possible embodiment of the present disclosure, the presentation of the prompt information may be displaying specific content of the target 13 (e.g., displaying an image of the target 13) by the alarm module 12, and also may be a lightening operation performed by the alarm module 12, so as to prompt the driver of the position of the target 13. For example, the alarm module 12 may display the image of the target 13 at a third region, or lighten the third region. The third region is a region of the alarm module, where the region is corresponding to the overlapping region.

For the implementations of the steps in the driving assistance method, reference may be made to the implementations of the modules or functions of the driving assistance system, which will achieve a same technical effect, and will not be described herein.

It should be appreciated that, the present disclosure relates to devices for executing one or more of the above-mentioned operations. These devices may be designed and manufactured specifically, or include any known devices for a general-purpose computer. Computer programs may be stored in these devices, and activated or reconstructed selectively. The computer programs may be stored in a readable medium (e.g., a computer-readable medium) or any other medium adapted to store therein instructions and coupled to a bus. The computer-readable medium may include, but not limited to, any disk (e.g., floppy disk, hard disk, optical disk, Compact Disk-Read Only Memory (CD-ROM) or magnetooptical disk), ROM, Random Access Memory (RAM), Erasable Programmable Read-Only Memory (EPROM), Electrically Erasable Programmable Read-Only Memory (EEPROM), flash memory, magnetic card or optical memory card. In other words, the readable medium may include any medium where information is stored or transmitted in a device-readable (e.g., computer-readable) form.

It should be further appreciated that, computer program instructions may be adopted to implement each of the structural diagrams and/or blocks in the flow charts and/or the block diagrams, and the combination of the structural diagrams and/or blocks in the flow charts and/or the block diagrams. These computer program instructions may be provided to a generally-purpose computer, a dedicated computer, or any other programmable data processor, so as to implement the functions assigned in the structural diagrams and/or one or more blocks in the flow charts and/or block diagrams through a computer or any other programmable data processor.

When the modules are capable of being implemented by software, considering a current hardware level, a hardware circuit may be provided to achieve a corresponding function of the modules, in the case that the cost is not taken into account. The hardware circuit includes a conventional very-large-scale integration (VLSI) circuit, a gate array, a conventional semiconductor such as a logic chip or a transistor, or any other discrete components. The modules may further be implemented by a programmable hardware device, such as a field-programmable gate array, a programmable array logic device and a programmable logic device.

The foregoing descriptions are merely embodiments of the present disclosure, and the protection scope of the present disclosure is not limited thereto. Variations or substitutions made by those skilled in the art without departing from the technical scope of the present disclosure shall fall within the protection scope of the present disclosure. Therefore, the protection scope of the present disclosure shall be defined by the appended claims.

What is claimed is:

1. A driving assistance system for a vehicle, comprising:
    an alarm module, arranged on a windshield wiper of the vehicle and configured to present prompt information;
    an acquisition module, configured to acquire a first image comprising a target outside the vehicle viewed at a first position and a second image comprising the alarm module viewed at the first position, the first position being a position where eyes of a driver are located; and
    a control module, coupled to the acquisition module and the alarm module, and configured to determine an overlapping region between a second region of the second image and a first region of the first image, and control the alarm module to present the prompt information about the overlapping region, the second region being a region occupied by the alarm module and the first region being a region occupied by the target;
    wherein the alarm module is of a bar-like shape, an extension direction of the alarm module is the same as an extension direction of the windshield wiper, and a length of the alarm module is not greater than a length of the windshield wiper.

2. The driving assistance system according to claim 1, wherein the acquisition module comprises a first collection unit, a second collection unit, and a processing unit coupled to the first collection unit and the second collection unit;
    wherein the first collection unit is configured to collect a third image comprising the target viewed at a second position, and the second position is a position where the first collection unit is located;
    wherein the second collection unit is configured to acquire position information about the eyes of the driver; and
    wherein the processing unit is configured to acquire the first image in accordance with the third image and the position information about the eyes of the driver, and acquire the second image in accordance with the position information about the eyes of the driver and position information about the alarm module.

3. The driving assistance system according to claim 2, wherein the first collection unit comprises one or more collection assemblies arranged at at least one of a head or a tail of the vehicle, and the second collection unit is arranged inside the vehicle.

4. The driving assistance system according to claim 1, wherein the acquisition module is configured to acquire 20 to 24 first images and 20 to 24 second images at uniform time intervals within one second.

5. The driving assistance system according to claim 1, wherein the target comprises at least one of: a lane marking, or, a person or another vehicle around a head of the vehicle.

6. The driving assistance system according to claim 1, wherein the alarm module is a light-emitting diode (LED) light bar or a flexible display.

7. The driving assistance system according to claim 1, wherein the alarm module is attached onto a side wall of the windshield wiper.

8. The driving assistance system according to claim 1, wherein the length of the alarm module is equal to the length of the windshield wiper.

9. The driving assistance system according to claim 1, wherein the prompt information comprises an image of the target, or lightening of a third region, and the third region is a region on the alarm module corresponding to the overlapping region.

10. A driving assistance method, applied to the driving assistance system according to claim 1, comprising:
    acquiring the first image comprising the target outside the vehicle viewed at the first position and the second image comprising the alarm module viewed at the first position, the first position being a position where the eyes of the driver are located;
    determining the overlapping region between the second region of the second image and the first region of the first image, the second region being a region occupied by the alarm module, and the first region being a region occupied by the target; and
    controlling the alarm module to present the prompt information about the overlapping region.

11. The driving assistance method according to claim 10, wherein the acquisition module comprises a first collection unit, a second collection unit, and a processing unit coupled to the first collection unit and the second collection unit;
    wherein the first collection unit is configured to collect a third image comprising the target viewed at a second position, and the second position is a position where the first collection unit is located;
    wherein the second collection unit is configured to acquire position information about the eyes of the driver;
    wherein the processing unit is configured to acquire the first image in accordance with the third image and the position information about the eyes of the driver, and acquire the second image in accordance with the position information about the eyes of the driver and position information about the alarm module; and
    wherein acquiring the first image comprising the target outside the vehicle viewed at the first position and the second image comprising the alarm module viewed at the first position comprises:
    collecting the position information about the eyes of the driver and the third image comprising the target viewed at the second position; and
    acquiring the first image in accordance with the third image and the position information about the eyes of the driver, and acquiring the second image in accordance with the position information about the eyes of the driver and the position information about the alarm module.

12. The driving assistance method according to claim 10, wherein acquiring the first image comprising the target outside the vehicle viewed at the first position and the second image comprising the alarm module viewed at the first position comprises: acquiring 20 to 24 first images and 20 to 24 second images at uniform time intervals within one second.

13. The driving assistance method according to claim 10, wherein the presentation of the prompt information comprises displaying an image of the target or lightening a third region, and the third region is a region on the alarm module corresponding to the overlapping region.

14. A vehicle, comprising the driving assistance system according to claim 1.

15. The vehicle according to claim 14, wherein the acquisition module comprises a first collection unit, a second collection unit, and a processing unit coupled to the first collection unit and the second collection unit;
wherein the first collection unit is configured to collect a third image comprising the target viewed at a second position, and the second position is a position where the first collection unit is located;
wherein the second collection unit is configured to acquire position information about the eyes of the driver; and
wherein the processing unit is configured to acquire the first image in accordance with the third image and the position information about the eyes of the driver, and acquire the second image in accordance with the position information about the eyes of the driver and position information about the alarm module.

16. The vehicle according to claim 14, wherein the alarm module is an LED light bar or a flexible display, and the alarm module is attached onto a side wall of the windshield wiper.

17. The vehicle according to claim 14, wherein the length of the alarm module is equal to the length of the windshield wiper.

18. The vehicle according to claim 14, wherein the prompt information comprises an image of the target, or lightening of a third region, and the third region is a region on the alarm module corresponding to the overlapping region.

19. A driving assistance system for a vehicle, comprising:
an alarm module, arranged on a windshield wiper of the vehicle and configured to present prompt information;
an acquisition module, configured to acquire a first image comprising a target outside the vehicle viewed at a first position and a second image comprising the alarm module viewed at the first position, the first position being a position where eyes of a driver are located; and
a control module, coupled to the acquisition module and the alarm module, and configured to determine an overlapping region between a second region of the second image and a first region of the first image, and control the alarm module to present the prompt information about the overlapping region, the second region being a region occupied by the alarm module and the first region being a region occupied by the target;
wherein the acquisition module is configured to acquire 20 to 24 first images and 20 to 24 second images at uniform time intervals within one second.

20. The driving assistance system according to claim 19, wherein the acquisition module comprises a first collection unit, a second collection unit, and a processing unit coupled to the first collection unit and the second collection unit;
wherein the first collection unit is configured to collect a third image comprising the target viewed at a second position, and the second position is a position where the first collection unit is located;
wherein the second collection unit is configured to acquire position information about the eyes of the driver; and
wherein the processing unit is configured to acquire the first image in accordance with the third image and the position information about the eyes of the driver, and acquire the second image in accordance with the position information about the eyes of the driver and position information about the alarm module.

* * * * *